United States Patent [19]
Dick et al.

[11] 4,168,086
[45] Sep. 18, 1979

[54] RADIUS ARM SUPPORT FOR A DRIVING AXLE

[75] Inventors: Wesley M. Dick, Fort Wayne, Ind.; Martin J. Hermanns, Milton, Wis.

[73] Assignee: Dana Corporation, Toledo, Ohio

[21] Appl. No.: 820,514

[22] Filed: Aug. 1, 1977

[51] Int. Cl.² .................... B60G 9/02; B62D 19/00
[52] U.S. Cl. .................... 280/689; 267/15 R; 280/725
[58] Field of Search ............... 280/689, 701, 724, 280/725; 267/15 R, 20 A; 180/71, 73 R, 73 TL

[56] References Cited

U.S. PATENT DOCUMENTS

| 740,051 | 9/1903 | Smith | 267/66 |
|---|---|---|---|
| 1,249,069 | 12/1917 | Grayson | 267/54 |
| 1,411,130 | 3/1922 | Suhre | 267/66 |
| 2,689,015 | 9/1954 | Nallinger | 180/73 R |

OTHER PUBLICATIONS

"Ford Service Publication," Nov. 1969, Dana 30AF Front Driving Axle, 15-08-02.

Primary Examiner—Joseph F. Peters, Jr.
Assistant Examiner—John A. Carroll
Attorney, Agent, or Firm—Robert M. Leonardi; Robert E. Pollock

[57] ABSTRACT

A vehicle suspension system is disclosed which has radius arms for connecting an axle assembly to a frame to accomodate the necessary relative movement therebetween. An improved connection is provided for rigidly securing the radius arms to the axle assembly. The connection consists of a cast wedge bracket adapted to be secured between an axle tube and wheel supporting yoke and mating wedge portions formed on the radius arm and associate clamp.

4 Claims, 5 Drawing Figures

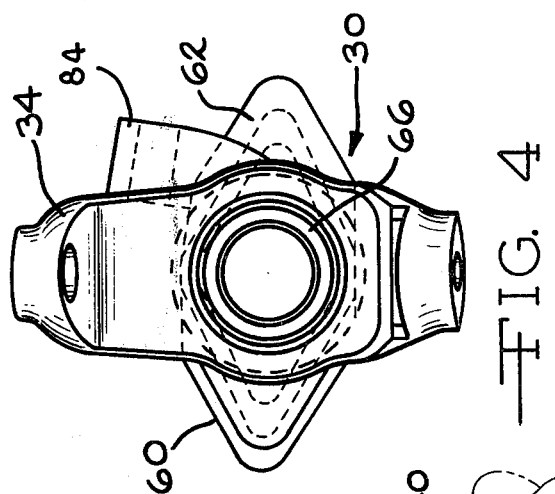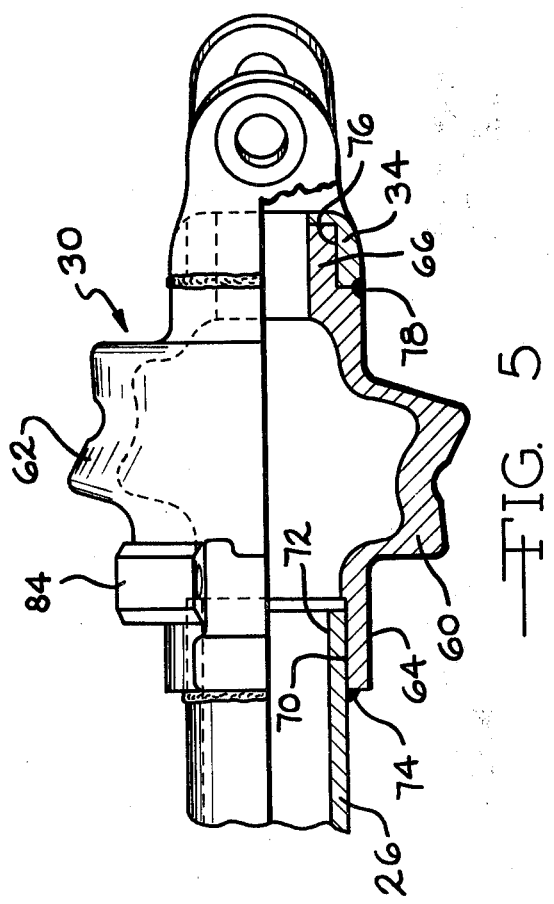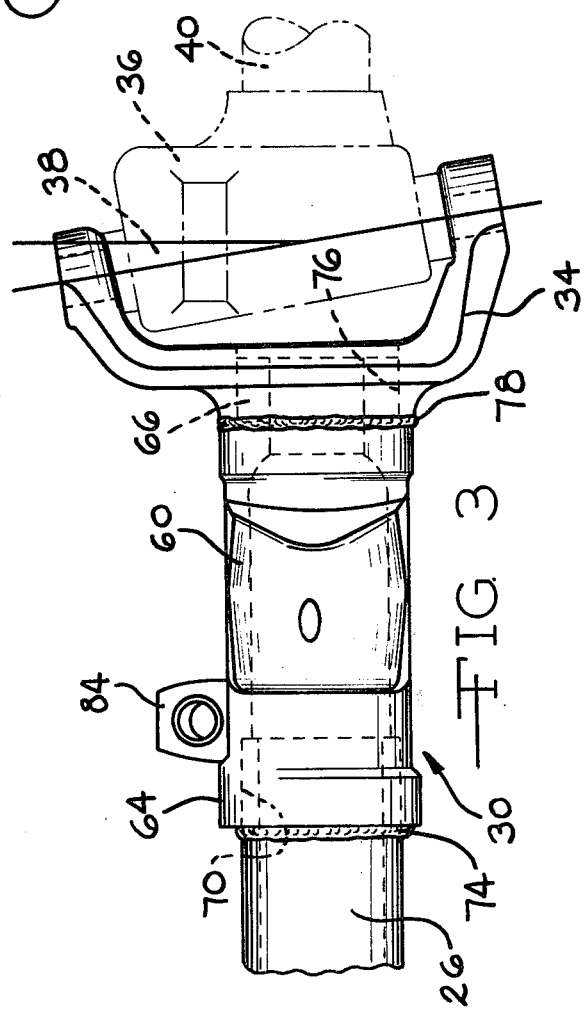

RADIUS ARM SUPPORT FOR A DRIVING AXLE

BACKGROUND OF THE INVENTION

This invention relates to vehicle suspension systems and more particularly to the type of system employing radius arms for connecting an axle assembly to a frame.

In designing a vehicle suspension system of the type referred to it is customary to pivotally connect one end of the radius arm to the frame and rigidly connect the opposite end to the axle assembly. The radius arm functions in conjunction with a conventional spring and shock absorber to control the relative movement that occurs between the axle assembly and frame as the road wheels, which are secured to the axle assembly, traverse uneven road surfaces. The radius arm also permits the frame to move up and down and tilt both laterally and longitudinally.

Finally, one of the main purposes of the radius arm is to prevent twisting of the front axle assembly when the vehicle is in motion thereby increasing the stability of the steering mechanism which is usually secured to the axle assembly.

The present invention is particularly concerned with a vehicle suspension system utilizing radius arms which have a wedge type connection provided at the axle assembly location. In known arrangements, to accomplish this connection, individual wedge elements are secured to opposite sides of an axle tube. One of the wedge elements is adapted to cooperate with an opposed wedge portion provided on the radius arm while the other wedge element cooperates with an opposed wedge portion provided on a mating clamp. The clamp is fastened to the radius arm to permit the wedge portions to engage and provide a rigid attachment to the axle tube.

In order to achieve the rigid attachment, it is essential that the individual wedge elements be precisely aligned on opposite sides of the axle tube and the mating portions on the clamp and radius arm fit snugly into engagement when the clamp is secured in place. To position the wedge elements, a special fixture is required to carefully locate the individual wedge elements against the axle tube and a subsequent welding operation is performed to secure the elements in place.

While this design has been satisfactory, due to the use of separate wedge elements, it has been relatively expensive to manufacture and also required a special fixture for assembly.

The present invention is intended to solve the above problems by providing a one-piece wedge element that eliminates the need for a special aligning fixture.

Another object of the invention is to reduce the cost of manufacture by providing a one-piece element wherein the opposed wedge portions are cast as an integral part thereof.

SUMMARY OF THE INVENTION

The above and other objects are achieved in the present invention by providing an improved wedge type connection for the axle assembly end of the radius arm which consists of a one-piece cast bracket located between an axle tube and a wheel yoke to form a unitary assembly. In a preferred embodiment, the bracket includes a main body portion having integral outwardly extending wedge portions adapted to cooperate with the radius arm and associate clamp member and integral opposed tubular sleeve portions adapted to be connected to the axle and wheel supporting yoke. The wedge portions are arranged to cooperate with mating wedge portions provided on the axle end of a conventional radius arm and an associate clamp which is fastened to the radius arm.

BRIEF DESCRIPTION OF THE DRAWINGS

Other objects and advantages of the invention will become apparent upon consideration of the following detailed description and the accompanying drawings, in which:

FIG. 3 is a front elevational view of the right hand wedge bracket assembly shown in FIG. 1;

FIG. 4 is a right end view of the structure disclosed in FIG. 3; and

FIG. 5 is a top view of the structure illustrated in FIG. 3.

DESCRIPTION OF THE PREFERRED EMBODIMENT

Figure 1:
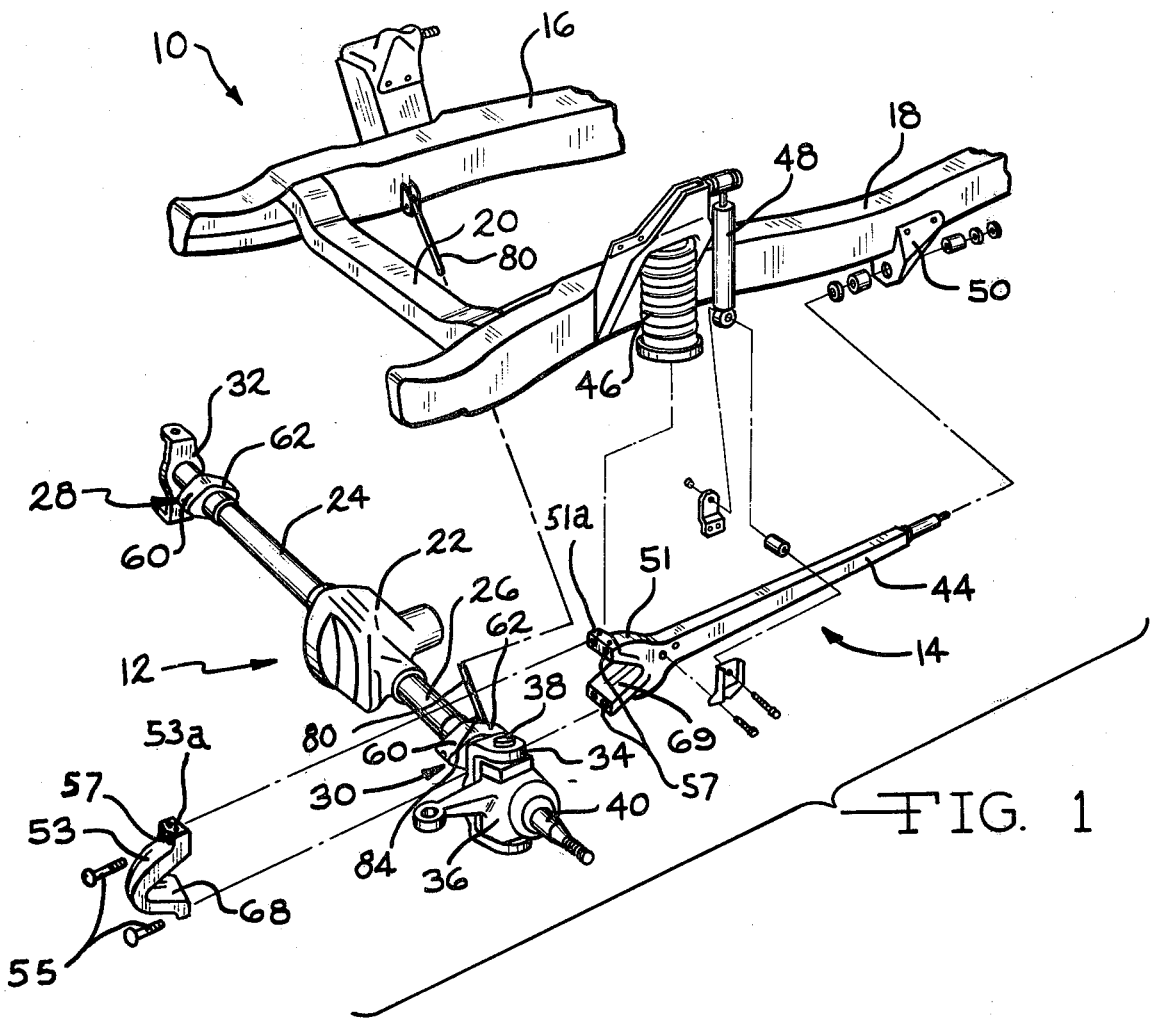
FIG. 1 is an exploded perspective view of an automotive frame and axle assembly showing a portion of a vehicle suspension system embodying a preferred embodiment of the invention.

Turning now to the drawings, FIG. 1 shows a portion of a motor vehicle chassis that includes a frame 10, a front axle assembly 12 and a suspension system shown generally at 14 for interconnecting the axle assembly 12 and frame 10. The axle assembly 12 is adapted to support conventional steerable wheels (not shown) at each end. More specifically, the frame 10 consists of longitudinally extending side rals 16 and 18 connected by a front transverse cross member 20.

The axle assembly 12 includes a differential housing 22, outwardly extending axle tubes 24 and 26, intermediate left and right hand wedge brackets 28 and 30 and associate yokes members 32 and 34 respectively. Each yoke member 32 and 34 is adapted to support a steering knuckle 36 (only one of which is shown) in the conventional manner by means of a king pin 38. The steering knuckle 36 is provided with an outwardly extending stub shaft 40 for connection to the supporting vehicle road wheel.

Figure 2:
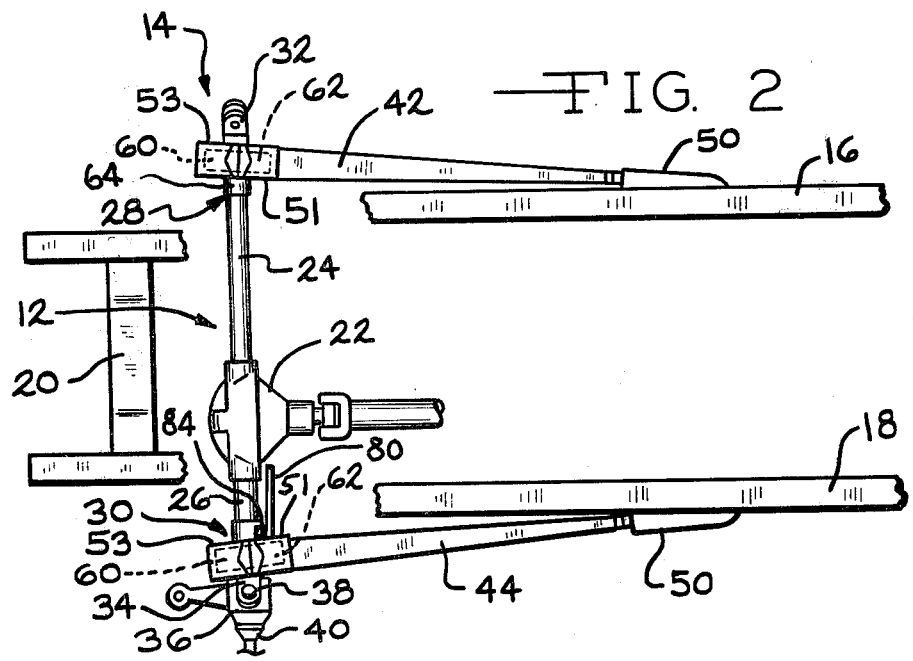
FIG. 2 is a partially broken away assembled top plan view of the suspension system shown in FIG. 1.

Referring to FIG. 2, the suspension system 14 is shown comprising right and left hand radius arms 42 and 44 respectively which are mounted at each side of the frame 10. The suspension system also includes conventional coiled springs 46 and shock absorbers 48 (shown only on one side in FIG. 1) for cooperating with each radius arm 42 and 44. Radius arms 42 and 44 along with springs 46 and shock absorbers 48 serve to resiliently connect the frame 10 and axle assembly 12. This connection allows the frame 10 to move freely up and down and tilt both laterally and longitudinally while being secured against endwise movement with respect to the axle assembly 12, i.e., it is prevented from pitching backward and forward.

To this end the inner end of each radius arm 42 and 44 is pivotally connected to the frame 10 by means of a bracket 50 which is secured to the outside of the side rails 16 and 18 (only one of which is shown). The pivotal connection is necessary at this point so that the radius arms 42 and 44 are capable of yielding universally in relation to the frame 10. The opposite end of each radius arm 42-44 is rigidly secured to the axle assembly 12 by means of an enlarged boss 51 formed thereon and a mating clamp member 53 which is adapted to cooperate with the wedge brackets 28-30. The boss 51 and clamp member 53 are provided with flat opposed inner surfaces which abut each other so that conventional fastening means 55 can pass through suitable aligned openings 57 in the clamp member 53 and boss 51 to secure the same about the wedge brackets 28-30.

As most clearly seen in FIG. 2, the differential housing 22 is displaced slightly off-center to accomodate for clearance of other vehicle components. Opposed bosses are formed on the housing 22 for receiving and securely fastening the inner ends of the axle tubes 24-26. In the present instances, due to the off-set construction, axle tube 24 is made substantially longer than axle tube 26. Each axle tube 24 and 26 has its outer end secured to the inside of the brackets 28-30 respectively. The outside portions of each bracket 28-30 is secured to yoke members 32 and 34 respectively. These connections will be discussed in greater detail later.

Further with reference to FIG. 2, it can be seen that the radius arms 42-44 extend longitudinally of the frame side rails 16 and 18, and, from pivot connection 50, extend slightly outwardly and downwardly toward the brackets 28-30. In assembled relation, the brackets 28-30 are disposed outside of the front portions of the side rails 16-18 with the mating line of the clamp member 53 and boss 51 lying on the axis of the axle tubes 24-26.

With the construction thus far described, it will be apparent that, as the ground engaging wheels traverse the road surface, any deviation from a normal flat surface will cause the axle assembly 12 to move relative to the frame 10. The relative movement is controlled by means of the connection of the radius arms 42-44 to the frame 10 and axle assembly 12 and further by the disposition of the springs 46 and shock absorbers 48 reacting therebetween. Because of the pivotal connection 50, the radius arms 42-44 are able to yield in conformity with the relative movement about this point. Due to the rigid connection at the opposite end, the radius arms 42-44 enable the axle assembly 12 to swing in an arc about the pivotal connection 50.

In the above described arrangement, the portion of the radius arms 42-44 attached to the frame 10 applies thrust to the axle assembly 12 to prevent the axle assembly 12 from pulling longitudinally on the springs 46. The force applied against the axle assembly 12 varies with a number of factors of design and use of vehicles employing such a system; for example, the vehicle weight, i.e., size and load carrying capacity, starting and stopping, uneven road surfaces, etc., occurring numerous times during the life of the vehicle constantly transmit heavy stress loads to the rigid connection provided at the axle location. Thus it will be evident that the connection at this point must be constructed in such a manner that it is capable of withstanding these loads and many more that might be directed to this location.

The present invention is intended to accomplish the above by providing an improved rigid connection for the axle assembly 12 that can withstand greater stresses at this location than known constructions. In the preferred embodiment of the invention this is accomplished by providing separate brackets 28-30 designed to fit between the ends of the axle tubes 24-26 and yokes 32-34 respectively to form a unitary axle section.

Since both brackets 28-30 are substantially identical and a description of one will readily lead to an understanding of the other, the following detailed description wll be made solely with reference to the right hand bracket 30 and associate radius arm 44.

Referring now to FIGS. 3-5, the bracket 30 is shown comprising a one piece cast member including a central portion consisting of first and second wedge elements 60-62 and oppositely extending tubular portions 64 and 66. The first and second wedge elements 60 and 62, as best seen in FIG. 2, are adapted to cooperate with the clamp member 53 and radius arm boss 51 to establish a rigid connection for the radius arms 42-44 to the axle assembly 12. For this purpose and as illustrated in FIG. 1, the inner end of the clamp member 53 is constructed with a V-shaped opening 68 of such a size as to closely conform to that of the first wedge element 60. Similarly, the inner surface of the radius arm boss 51 is constructed with a V-shaped opening 69 corresponding to the shape of the second wedge element 62. It is desirable that the widths of the wedge elements 60 and 62 and of clamp member 53 and radius arm boss 51 be substantially equal. Thus, when positioned in mating contact and securing of the fastening means 55 in place, the V-shaped openings 68 and 69 are in substantially flush contact with the wedge element 60 and 62 so that no relative movement occurs during operating conditions. If desired, resilient gaskets can be positioned between the mating surfaces.

To accomodate the angular position of the radius arms 42-44, the wedge elements 60 and 62, as viewed from the top and illustrated in FIG. 5, are cast at an angle which is equal to the angle of the radius arms 42-44, with respect to the side rails 16 and 18.

It will also be seen in FIG. 1 that the top portions of the clamp member 53 and radius arm boss 51 are constructed with substantially flat faces 53a and 51a respectively which, when assembled, will serve as a suitable mounting surface for attaching the spring seat 46a for spring 46.

As illustrated best in FIGS. 3 and 5, the oppositely extending tubular portions 64 and 66 of bracket 30 are cast integral with the central portion and the bracket 30 is adapted to be positioned between the axle tube 26 and yoke 34 so that the tubular portion 64 cooperates with the axle tube 26 and the tubular portion 66 cooperates with the yoke 34. More specifically, the tubular portion 64 is provided with a bore 70 substantially equal to the diameter of the axle tube 26 and of a depth sufficient to receive an end portion 72 thereof. An annular weld 74 surrounds the axle tube 26 adjacent the outer end of the tubular portion 64 to rigidly secure the members in assembled relation. The tubular portion 66 is adapted to fit within a bore 76 in the yoke 34 and an annular weld 78 is provided to rigidly secure the same to the yoke 34. Thus, when assembled in this manner the axle tube 26, bracket 30 and yoke 34 form a rigid unitary assembly.

Due to the integral construction of the wedge and the tubular portions that comprise the cast brackets 28 and 30 and the location between the axle tube 26 and yoke 34, the application of forces to the axle assembly 12 are distributed in a much more satisfactory manner than that of the prior designs.

From the foregoing, it will be seen that the present invention provides a suspension system having an improved cast wedge bracket design which will eliminate the need for special tools and the like required when using individual bracket elements which are welded directly to an axle tube. Casting the wedge portions and connecting sleeves as one integral member, permits the same member to be used in a number of different applications by merely machining the tubular extensions to size.

Another advantage in utilizing a cast member is that additional bosses can be cast as an integral part of one or both of the wedge brackets and made to serve as mounting or connections for various other components normaly associated with the axle and suspension system. For example, in the particular type of suspension system shown in FIGS. 1 and 2, it is common practice to employ a lateral stability member which functions to secure the axle assembly 12 in a transverse direction relative to the vehicle frame 10 while allowing for the normal vertical movement required to absorb road shocks through the springs 46 and shock absorbers 48. In the present instance, as seen in FIG. 1, the lateral stability member is shown as being a track bar 80. One end of the track bar 80 is pivotally connected to the inside of the side rail 16 by means of a bracket 82. To connect the opposite end of the track bar 80 to the axle assembly 12 an integral boss 84 is cast on the wedge bracket 30. The end of the track bar 84 can be secured to the boss 84 in any well known manner.

Additional bosses can be provided on the wedge brackets 28 and 30 to receive mounting plates required for attaching brake hoses, speedometer cables and any extra equipment needed to operate mechanisms in the wheel, brake and axle assembly. These bosses, as in the case of the boss 84, can be added in such a manner as not to disturb the functional strength or integrity of the wedge brackets.

From the foregoing, it will be evident that numerous modifications and alterations may occur to those skilled in the art without departing from the spirit and scope of the invention as defined in the following claims.

What is claimed is:

1. A vehicle suspension system for use between a frame and an axle assembly disposed below the frame, the axle assembly comprising:
    an axle shaft having an outer end,
    a yoke member aligned with and spaced from said axle shaft outer end,
    bracket means disposed between said axle shaft outer end and said yoke member,
    said bracket means having a main body portion and integral outwardly extending inner and outer mounting portions,
    said inner mounting portion secured to said axle outer end and said outer mounting portion secured to said yoke member,
    said main body portion defining first and second opposed wedge elements having walls which converge at their free ends,
    a radius arm having one end pivotally attached to the frame and a bifurcated end defining converging walls for engaging said converging walls of said first wedge element,
    a clamp having converging walls for engaging said converging walls of said second wedge element, and
    fastening means for securing said clamp to said bifurcated end of said radius arm to rigidly secure said mating walls in mating engagement.

2. A vehicle suspension system according to claim 1 wherein said inner mounting portion of said bracket means includes a bore, said axle outer end is secured in said bore, said yoke member includes a bore, said outer mounting portion of said bracket means is secured in said yoke member bore.

3. A vehicle suspension system according to claim 1 wherein said radius arm extends longitudinally and outwardly of the frame, said first and second opposed wedge elements, said clamp and said bifurcated end of said radius arm being angularly disposed with respect to the frame.

4. A vehicle suspension system according to claim 1 wherein said mating walls have widths of substantially equal dimension.

* * * * *